US008312231B1

(12) United States Patent
Li et al.

(10) Patent No.: US 8,312,231 B1
(45) Date of Patent: Nov. 13, 2012

(54) METHOD AND SYSTEM FOR MOUNTING LOGICAL UNIT NUMBERS (LUNS) OF SNAPSHOTS

(75) Inventors: Song Li, Sunnyvale, CA (US); Boris Teterin, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 592 days.

(21) Appl. No.: 12/264,779

(22) Filed: Nov. 4, 2008

(51) Int. Cl.
*G06F 12/00* (2006.01)
(52) U.S. Cl. ......... 711/154; 711/118; 711/161; 711/162
(58) Field of Classification Search .......... None
See application file for complete search history.

(56) References Cited

U.S. PATENT DOCUMENTS

| | | | |
|---|---|---|---|
| 6,092,169 A * | 7/2000 | Murthy et al. | 711/170 |
| 7,941,501 B2 * | 5/2011 | McCabe et al. | 709/217 |
| 2002/0137497 A1 * | 9/2002 | Gillespie | 455/415 |
| 2008/0222373 A1 * | 9/2008 | Garimella | 711/161 |

\* cited by examiner

*Primary Examiner* — Kevin Ellis
*Assistant Examiner* — Alan Otto
(74) *Attorney, Agent, or Firm* — Schwegman Lundberg & Woessner, P.A.

(57) ABSTRACT

A computer system and method for caching configuration information for use in mounting and/or unmounting snapshot LUNs of a network-based storage system are disclosed. During a first request to mount a snapshot LUN, a discovery operation is performed at a host system to discover various configuration information used in mounting and unmounting various LUNs of a storage system to a host system. The configuration information is used to process the first request and then the configuration information is cached. During a subsequent request to mount a second snapshot LUN, the cached configuration information can be used to mount the second snapshot LUN, thereby avoiding a second discovery operation.

24 Claims, 5 Drawing Sheets

METHOD AND SYSTEM FOR MOUNTING LOGICAL UNIT NUMBERS (LUNS) OF SNAPSHOTS

TECHNICAL FIELD

The present application relates generally to data storage systems, and more specifically, to a system and method for caching, at a host system, configuration information for use in mounting and/or unmounting Logical Unit Numbers (LUNs) of snapshots on a network-based storage system.

BACKGROUND

Despite the vast improvement in the overall performance and reliability of storage devices (e.g., disk drives or flash memory drive), it is imperative that enterprises have disaster recovery systems and procedures in place. To that end, many enterprises are relying on the backup capabilities of network-based disk arrays (e.g., network-attached storage (NAS) and storage area network (SAN) systems), referred to herein simply as network-based storage systems. One feature of network-based storage systems that is particularly useful to enterprises is a type of backup procedure commonly referred to as a snapshot—a copy of a set of files, directories or data blocks as they were at a particular point in the time.

Many server applications, such as Oracle® database, and Microsoft® Exchange and SQL Server, are able to utilize snapshots as a mechanism for backing up data. A typical backup procedure for one of these server applications involves two distinct phases—a backup phase and a verification phase. Referring to FIG. 1, the backup phase involves generating the actual snapshot from an existing volume at the network-based storage system 10. For instance, a server application 12 executing on the host system 14 requests that a backup (e.g., snapshot) be generated for a particular database, for example, "F:\databases\db_1." In this case, "db_1" is the name of a database located on the volume and disk assigned to drive letter "F:\" and in the directory "databases". When drive letter "F:\" is mapped to a Logical Unit Number (LUN) of a network-based storage system 10, a storage management application 16 executing on the host system 14 initiates a snapshot operation by communicating one or more commands or instructions to the storage system 10, directing the storage system 10 to initiate the snapshot operation and generate the snapshot at the storage system 10.

After the snapshot has been generated, the host-based server application 12 performs a verification process to ensure that the snapshot operation captured the proper data and that no data corruption has occurred. However, in order for the server application 12 executing at the host system 14 to read and verify the snapshot data, the mount (and unmount) logic 18 of the host system 14 must first mount the snapshot to the host system 14. Because a snapshot may be associated with multiple LUNs, the verification process may require that the host system 14 consecutively mount one LUN after another until each LUN of the snapshot has been mounted, verified, and unmounted.

Mounting a LUN of a snapshot to the host system 14 requires that the storage management application 16 at the host system 14 perform a discovery operation to map the host-based snapshot reference (e.g., H:\snapshots\sn_1) to a storage system-based reference (e.g., a LUN path) corresponding to a LUN of the snapshot. For example, the discovery operation generally requires that the dynamic mapping logic 20 of the mount logic 18 on the host system 14 identify the various resources available and in-use at both the host system 14 and the storage system 10. For example, during the discovery operation, dynamic mapping logic 20 of the host system 14 performs volume and disk enumeration procedures to analyze volume and disk objects at the host system 14 for the purpose of identifying the various volumes and disks "known" to the host system, and the alphabetical identifiers (e.g., drive letter assignments, such as, "C:\" or "D:\") and/or volume mount points and their corresponding physical or logical drives, partitions or LUNs (Logical Unit Numbers). The information resulting from the volume and disk enumeration operations is filtered to identify the specific mappings between host-based references and any LUN information of the storage system 10 that corresponds with the snapshot that is to be mounted to the host system 14. Once the discovery operation has completed, the storage management application 16 will mount a LUN of the snapshot that is being verified by generating a mapping of a host-based reference (e.g., a drive letter assignment or volume mount point) to the LUN information (e.g., LUN path) identifying the location of the snapshot on the storage system.

Once a LUN of the snapshot has been mounted to the host system 14, the server application 12 reads and analyzes the snapshot data associated with that specific LUN to verify that the data have not been corrupted and the data represent a viable backup. When the verification process is completed, the LUN of the snapshot is unmounted from the host system 14. If there are other LUNs associated with the snapshot, the above-described process is repeated until each LUN of the snapshot has been mounted, verified and unmounted. If the server application 12 at the host system 14 has multiple snapshots to verify—as is often the case with Oracle® database, Microsoft® Exchange and SQL Server, where each snapshot may represent a backup of a particular database—the server application 12 must go through the mounting and unmounting procedure for each LUN of each snapshot to be verified. Unfortunately, for each mount request received, the discovery process described above must be performed so that a LUN can be dynamically mapped to a host-based resource at the time the mount request is received and processed. Consequently, the time consuming discovery operation must be repeated each time a LUN of a snapshot is to be mounted. This causes an undesirable delay in the verification of a set of snapshots, due to the time it takes to mount the LUNs corresponding with a snapshot.

SUMMARY

Computer systems and methods for caching configuration information for use in mounting and/or unmounting Logical Unit Numbers (LUNs) of a snapshot on a network-based storage system are disclosed. In one embodiment of the invention, a computer system includes a storage management application for servicing requests to mount and unmount LUNs of snapshots on a network-based storage system. When processing an initial request to mount a LUN of a snapshot, the storage management application performs a discovery operation to identify configuration information used when mounting LUNs of snapshots on the storage system. This configuration information is cached so that a subsequent request to mount a LUN of the same, or a different, snapshot can utilize the information from the cache, rather than perform a second discovery operation to rediscover the configuration information. By utilizing the configuration information from the cache as opposed to dynamically discovering the configuration information, a LUN of a snapshot can be mounted and unmounted rapidly. This allows a server application to quickly verify a number of snapshots.

In another aspect, the storage management application includes cache policy enforcement logic. The cache policy enforcement logic ensures that the cached configuration information is not stale, when used in the processing of a request to mount a LUN of a snapshot. For instance, in one embodiment, a time stamp may be associated with each cache entry, and after a pre-determined period of time, a cache entry may be determined to be stale and therefore deleted or otherwise removed from the cache. Alternatively, in one embodiment, cache entries may be dynamically updated between mount operations. Other aspects of the invention will become apparent from the detailed description that follows.

BRIEF DESCRIPTION OF DRAWINGS

Some embodiments are illustrated by way of example and not limitation in the figures of the accompanying drawings in which.

DETAILED DESCRIPTION

Methods and systems for caching, at a host system, configuration information for use in mounting and/or unmounting the LUNs of snapshots on a network-based storage system are disclosed. In the following description, for purposes of explanation, numerous specific details are set forth in order to provide a thorough understanding of example embodiments. It will be evident, however, to one skilled in the art that the present invention may be practiced without these specific details.

Consistent with one embodiment of the invention, disclosed herein is a computer system having LUN mount (and unmount) logic that caches configuration information suitable for use in processing a request to mount (to the computer system) or unmount (from the computer system) the LUNs of snapshots on a network-based storage system. The cached configuration information is particularly useful when a server application, (e.g., such as Oracle® database, Microsoft® Exchange Server or SQL Server), executing at the computer system, performs consecutive snapshot verification operations to verify the viability of several database snapshots. A typical verification operation involves mounting a LUN, verifying data associated with the LUN, and then unmounting the LUN. For example, during each snapshot verification operation, the LUNs of a snapshot are consecutively mounted to the computer system so the server application can verify the snapshot data by reading and analyzing the snapshot data residing on the network-based storage system. After the snapshot data are verified, the LUN of the snapshot is unmounted from the computer system.

The configuration information required to mount LUNs of snapshots to the computer system is identified during a discovery operation that occurs, for example, when a request to mount a first LUN of a snapshot is processed. Alternatively, the discovery operation may occur as a result of the mount logic receiving an explicit command to populate the cache with the configuration information. In any case, by caching the configuration information discovered during the discovery operation, a server application's subsequent request to mount a LUN of the same snapshot, or a different snapshot, can be processed utilizing the cached configuration information, as opposed to dynamically discovering or determining the configuration information for each subsequent mount request. Because the configuration information is subject to change over time, the cache has associated with it a cache policy that is enforced to prevent stale configuration information from being used to process a request to mount (or unmount) a LUN of a snapshot. Other aspects of the invention will become apparent from the description of the figures that follows.

Figure 1:
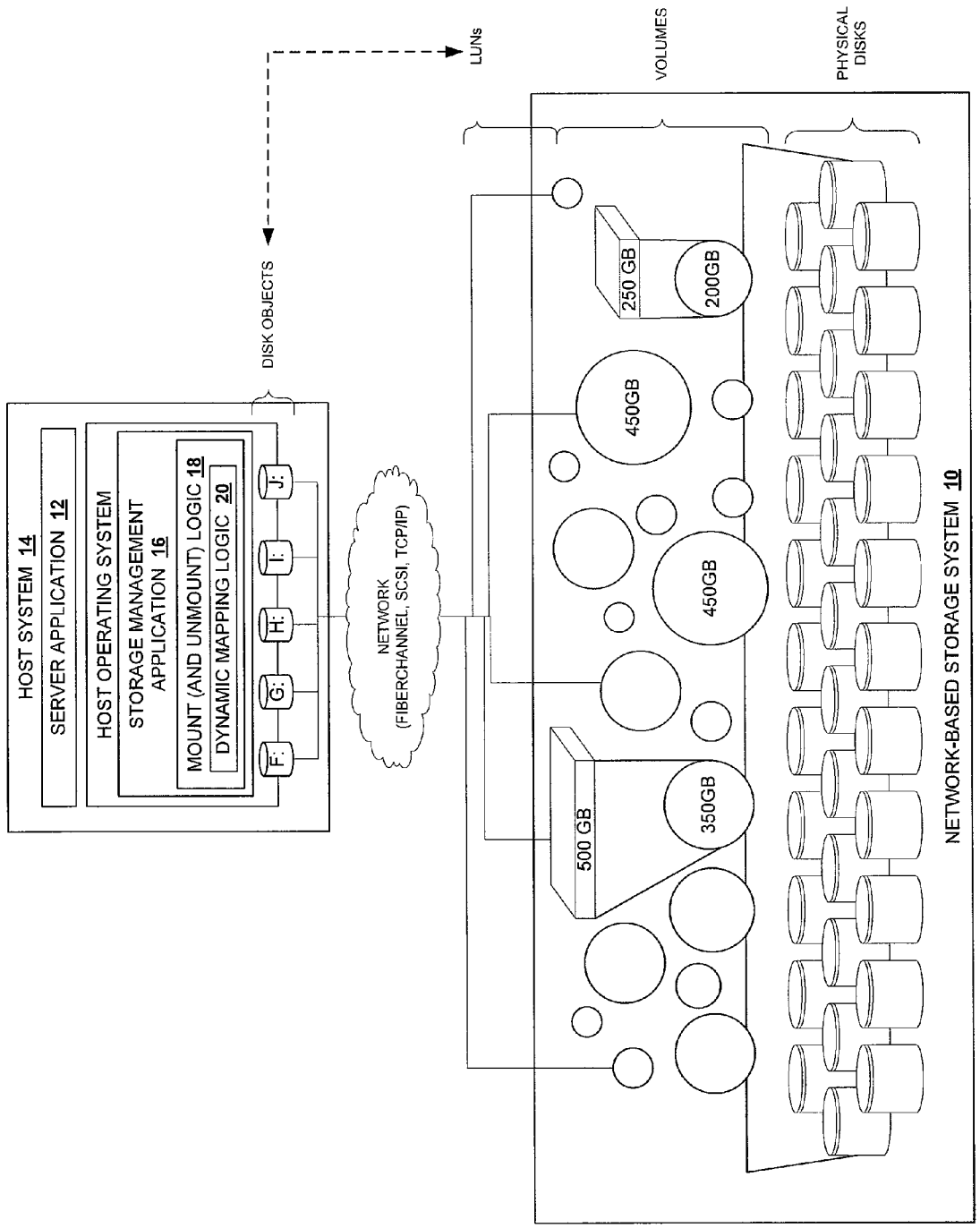
FIG. 1 illustrates a functional block diagram of a network-based storage system connected by means of a network to a host system having dynamic mapping logic for dynamically mapping a LUN of a snapshot to the host system during a mount operation.
Figure 2:
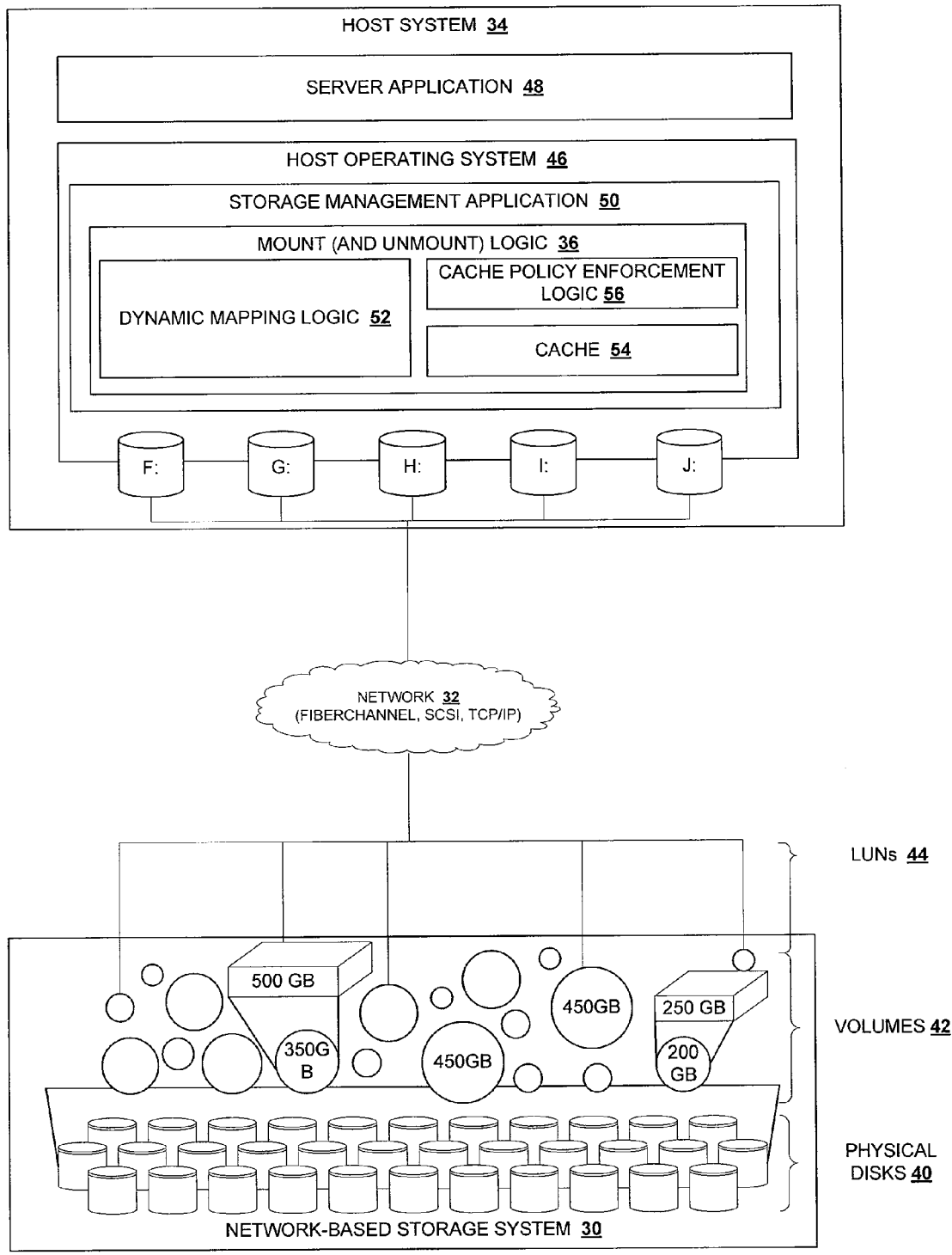
FIG. 2 illustrates a functional block diagram of a network-based storage system connected by means of a network to a host system having LUN mount (and unmount) logic, which, consistent with an embodiment of the invention, utilizes configuration information stored in a cache when mounting a snapshot LUN.

FIG. 2 illustrates a functional block diagram of a network-based storage system 30 connected by means of a network 32 to a host system 34 with LUN mount (and unmount) logic 36, which, consistent with an embodiment of the invention, utilizes configuration information stored in a cache 38 when mounting or unmounting a LUN of a snapshot. As described in greater detail below, by utilizing configuration information in the cache 38 when mounting a LUN of a snapshot, a discovery operation for dynamically mapping a host-based reference to a storage system-based reference need not be performed for each mount request that is processed. This is particularly advantageous during a series of database snapshot verification operations performed by a server application that is executing on a host system having a significant number of drive letters and/or volume mount points that have been mapped to a significant number of LUNs of one or more network-based storage systems.

As illustrated in FIG. 2, the network-based storage system 30 is shown to include several physical disks 40 that have been logically partitioned to form volumes 42 such that each volume is addressable by one or more logical unit numbers or LUNs 44. Although the storage system in FIG. 2 is shown to have five independent LUNs, in various embodiments the storage system 30 will have hundreds, or even thousands of LUNs. Similarly, the storage system 20 is shown in FIG. 2 to be connected to a single host system 34; however, in various alternative embodiments, the storage system 30 will be configured to service several host systems.

The network-based storage system may be a network-attached storage (NAS) system, a storage area network (SAN) based system, or a hybrid. Accordingly, the storage system 30 services clients, such as the host system 34, by communicating data via file-based protocols (e.g., network file system protocol (NFS), common internet file system or server message block protocol (CIFS/SMB)), or alternatively, block-based protocols (e.g., small computer system interface (SCSI)), or both. Accordingly, the network 32 includes routers, controllers or other network nodes suitable for communicating file-based or block-based data between the host system 34 and the storage system 30.

The host system 34 may be a server, a work station or some other computing system suitable for executing a host operating system 46 and various applications 48, as well as communicating data over a network 32 to a storage system 30. In one embodiment, the host system 34 executes a variant of a Microsoft Windows® operating system, such as Windows NT, Windows Server 2003 or Windows Server 2008. In an alternative embodiment, the host system may implement a variant of the UNIX operating system.

Consistent with one embodiment, the host system 34 includes a storage management application 50, which, among other things, facilitates the provisioning and configuration of storage at the storage system 30 by a host administrator. In some embodiments, the storage management application 50 is tightly integrated with the host operating system 46. For instance, the storage management application 50 operates to enhance the functionality of the host operating system 46 by operating as a system level service that can be accessed as a "snap-in" via the host operating system's management console. Accordingly, utilizing the interface of the management console, a host administrator is able to create a volume on the storage system 30 and direct the host system 34 to mount the volume to the host system by assigning the volume an available alphabetical drive letter, or volume mount point. In this case, a volume mount point is a directory within the namespace of the host system's local file system.

In addition to being tightly integrated with the host operating system 46, in one embodiment, the storage management application 50, or a portion thereof, is tightly integrated with one or more specific server applications (e.g., Oracle® database, Microsoft® Exchange or SQL Server). For example, the storage management application 50 provides a common application programming interface (API) that can be accessed by a server application 48 via function calls. Accordingly, the host operating system 46 or a server application 48 directs an API function call to the storage management application 50 to request that a snapshot be initiated, or a LUN of a snapshot be mounted or unmounted, and so on. As described in greater detail below, one such API function call is a request to populate a cache with configuration information useful in mounting (and unmounting) the LUNs of snapshots. A request to populate a cache with configuration information indicates to the storage management application 50 that it is to perform a discovery operation and populate the cache with configuration information that can be used when processing subsequent requests to mount LUNs of snapshots. The configuration information included in a cache entry of the cache includes, for example, a mapping of volume and disk objects specifying host-based references (e.g., drive letters and/or volume mount points of the host system 34) to LUN information (e.g., LUN paths) for LUNs 44 of the network-based storage system 30. In addition, for each cache entry, initiator information is specified, indicating one or more protocols supported by an initiator available to the host system 34 for communicating with the network-based storage system 30. In this context, an initiator is an available host adapter configured for use by the host to establish a session and communicate with a network-based storage system (e.g., a target). An initiator will utilize one of a variety of communication protocols to include: Small Computer System Interface (SCSI), iSCSI, Fibre Channel Protocol (FCP), Hyper-SCSI, Serial Advanced Technology Attachment (SATA) and Infiniband.

When a server application 48 is verifying a series of snapshots, for each snapshot being verified the server application 48 will consecutively mount, verify, and unmount the LUNs of the snapshot(s). By specifying in a first request that the storage management application 50 is to populate a cache with configuration information used in mounting and unmounting LUNs, the storage management application 50 is able to perform a discovery operation to identify the configuration information, cache the configuration information, and then utilize the cached configuration information when processing subsequent requests to mount LUNs of snapshots. Advantageously, this improves the performance of a series of database verification operations because the cached configuration information can be used to mount and unmount LUNs, as opposed to having the storage management application dynamically discover the configuration information (e.g., via the discovery operation) for each mount request that is received and processed.

As illustrated in FIG. 2, the storage management application 50 includes dynamic mapping logic 52, a cache 54, and cache policy enforcement logic 56. The dynamic mapping logic 52, as the name suggests, dynamically maps an object in the name space of the host's local file system with a volume or snapshot volume residing at the storage system 30. Accordingly, when the mount (and unmount) logic 36 receives a request to mount a LUN of a snapshot to the host system 34, the dynamic mapping logic 52 will identify the LUN path associated with the LUN of the snapshot to be mounted, and map the LUN path to a drive letter or volume mount point. In order to do this, however, the dynamic mapping logic 52 must perform a discovery operation to identify various configuration information used during the actual mounting of the LUNs. For instance, the configuration information that is discovered during the discovery operation may include all of the existing drive letters and volume mount points that are currently mapped to local disks, and/or LUNs of a network-based storage system. In addition, the configuration information may include the LUN paths of various volumes or snapshots on one or more network-based storage systems that are mapped to the host system. Finally, the configuration information may also include initiator information, such as the number and type of host adapters suitable for communicating with network-based storage systems, and the protocols those host adapters are configured to utilize when communicating with a network-based storage system.

To identify the configuration information to be cached, the dynamic mapping logic 52 performs a series of resource enumeration operations. For instance, the dynamic mapping logic 52 performs a volume object enumeration operation to identify the disk objects that are associated with various volumes. Next, the dynamic mapping logic 52 performs a disk object enumeration operation to identify the disks known to the host system that are mapped to various LUNs of the storage system. Finally, the dynamic mapping logic 52 queries the storage system 30 for LUN path information that is used in mapping the host-based disk objects to the LUNs of the storage system 30. In some embodiments, the exact nature and format of the configuration information will vary. In general, however, the configuration information can be characterized as information useful, if not necessary, in mounting or unmounting a LUN of a storage system to the host system.

In one embodiment of the invention, the dynamic mapping logic 52 caches or stores the configuration information obtained via the discovery operation in the cache 38 or some other memory. For instance, when processing a request to populate the cache, any configuration information discovered is cached in the cache if that configuration information is useful in processing a request to mount or unmount a LUN of a snapshot. Accordingly, when such a directive or command is received, the mount logic 36 will cache certain configuration information in the cache 38. This configuration information is used when the mount logic 36 is processing subsequent requests to mount LUNs of snapshots, thereby avoiding a second or subsequent discovery operation. For example, by using configuration information in the cache, the configuration information does not have to be dynamically discovered and mapped for each mount request.

In one embodiment, each time a cache entry is written to the cache 54, a time stamp is associated with the cache entry and written into the cache 54. The time stamp can be used in enforcing a cache policy. For instance, in one embodiment, a server application 48 requests that a cache be populated with configuration information for a certain predetermined period of time. During this predetermined period of time, the configuration information in the cache 54 is considered to be valid and can therefore be used by the mount logic 36 when processing a request to mount a LUN. However, at the expiration of the predetermined time period, the cache entries are considered to be invalid or stale, and therefore are not to be used to process requests to mount or unmount a LUN. Accordingly, the cache policy enforcement logic 56 enforces a cache policy associated with the cache.

Figure 3:
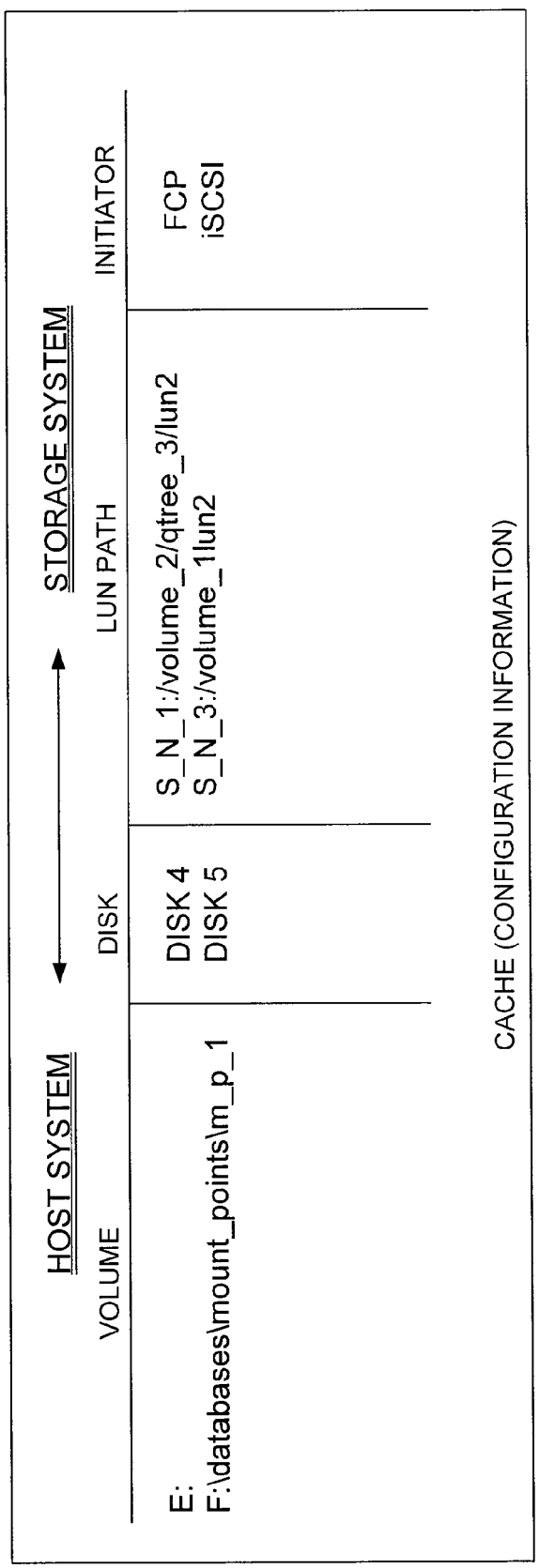
FIG. 3 illustrates an example of configuration information that may be cached during a discovery operation associated with a request to populate a cache, or a request to mount a LUN, according to an embodiment of the invention.

FIG. 3 illustrates an example of configuration information that is cached during a discovery operation associated with a request to populate a cache, or a request to mount a LUN, according to an embodiment of the invention. In general, the cached configuration information will include any information that is required or useful in mounting or unmounting a LUN of a snapshot residing at a network-based storage system to a host system. Accordingly, the configuration information, as shown in FIG. 3, will generally consist of both host-side information and storage system-side information. Specifically, the configuration information will include information that maps a host-side reference (e.g., a drive letter and file name specified in the name space of the local file system) to a storage system-based reference (e.g., a LUN path). The configuration information in the example cache illustrated in FIG. 3 is provided to illustrate the nature of the information that may be cached. It will be readily understood by those skilled in the art that in various embodiments, the specific configuration information and its format may vary considerably depending upon various factors such as the type of storage system being used (e.g., NAS or SAN), and so on.

As illustrated in FIG. 3, the cached configuration information includes information regarding the mapping of drive letter assignments to LUN paths. In addition, cached configuration information includes volume mount points mapped to LUN paths. Although not expressly shown in FIG. 3, a time stamp may be shown along with each cache entry to indicate the time that the particular entry was initially written to the cache. As described in greater detail below, the time stamp is used by the cache policy enforcement logic 54 to determine whether a particular cache entry is stale, or not.

As illustrated in FIG. 3, the configuration information includes initiator information indicating the various initiator protocols available to the host system for communicating with a particular target storage system. For example, the initiator information is specified on a per cache entry basis, such that each particular cache entry includes information about the initiator protocols used to communicate data between the host and the network-based storage system. When a request to mount a snapshot is received, the mount logic 36 can determine whether the configuration information necessary for mounting a specific LUN of the snapshot is within the cache. If so, the mount logic 36 can utilize the configuration information from the cache to process the request, and the dynamic mapping logic 52 need not perform a timely discovery operation.

Figure 4:
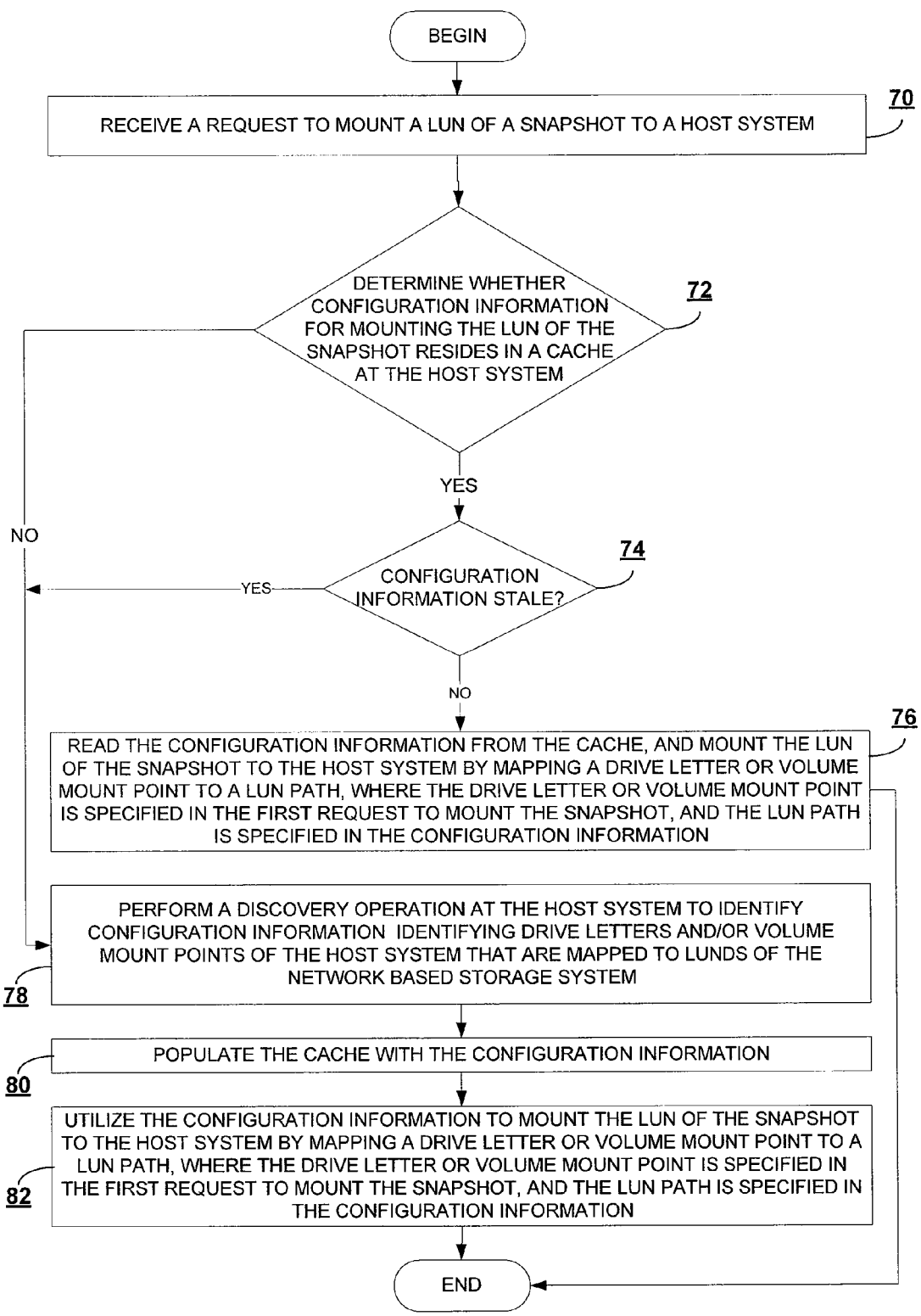
FIG. 4 illustrates an example of a method for utilizing cached configuration information for use in mounting and/or unmounting a snapshot LUN, according to an embodiment of the invention.

FIG. 4 illustrates an example of a method for utilizing cached configuration information in mounting and/or unmounting a LUN of a snapshot, according to an embodiment of the invention. At method operation 70, a request to mount a LUN of a snapshot to a host system is received. For example, a server application 48 executing at the host system 34 communicates to the storage management application 50 a request to have a particular snapshot mounted. At method operation 72, the storage management application 50 determines whether configuration information for mounting the requested LUN of the snapshot is residing within a cache at the host system.

If the necessary configuration information is residing in the cache, at method operation 74, the storage management application determines whether the configuration information is stale, or not. For example, the cache policy enforcement logic 56 analyzes a time stamp associated with the cache entry including the configuration information, and depending upon the cache policy and when the cache entry was originally written to the cache, the status of the cache entry (e.g., stale or valid) and thus the configuration information may be determined.

If not stale, at method operation 76, the configuration information is read from the cache and used to process the request to mount the LUN of the snapshot. Specifically, the configuration information is used to map a host-based reference, such as a drive letter or volume mount point, to a storage system-based reference, such as a LUN path specified in the configuration information. Once the LUN of the snapshot is mounted, the data within the snapshot can be read, analyzed and verified, by an application executing at the host system. In one embodiment of the invention, a snapshot is a read only copy of data, and thus the host system cannot write to the snapshot, or overwrite existing data of the snapshot. However, in an alternative embodiment, prior to mounting, a snapshot may be converted to a volume clone, which is writable. Accordingly, once mounted, the host system can read from and writed to the volume clone.

If the configuration information is determined not to be within the cache at method operation 72, then at method operation 78 the dynamic mapping logic 52 of the storage management application 50 performs a discovery operation to identify configuration information including drive letters and/or volume mount points that are mapped to specific LUN paths of the storage system. For example, in one embodiment, the discovery operation includes performing one or more resource enumeration operations on both the host and storage system, to ascertain how host-based references are mapped to physical storage of the storage system. In addition, the initiator information used to communicate data to and from certain LUNs is determined. At method operation 80, the configuration information discovered during method operation 78 is used to populate a cache. Although method operations 78 and 80 are shown as two separate steps occurring one after the other, it will be appreciated that these two method operations may occur in an iterative form, such that individual items of configuration information are discovered, then written to the cache, until all such configuration information has been discovered and written to the cache. In any case, at method operation 82, the configuration information is utilized to process the request to mount the LUN of the snapshot.

In an alternative embodiment, prior to method operation 70, a request to populate the cache with configuration information is received. In this case, the storage management application performs the discovery operation (as indicated in method operation 78), and populates the cache in response to receiving the request to populate the cache. Accordingly, a discovery operation may be the result of processing an explicit command to populate a cache, or alternatively, an operation for which a cache miss occurs with the cache when processing a request to mount a LUN.

Figure 5:
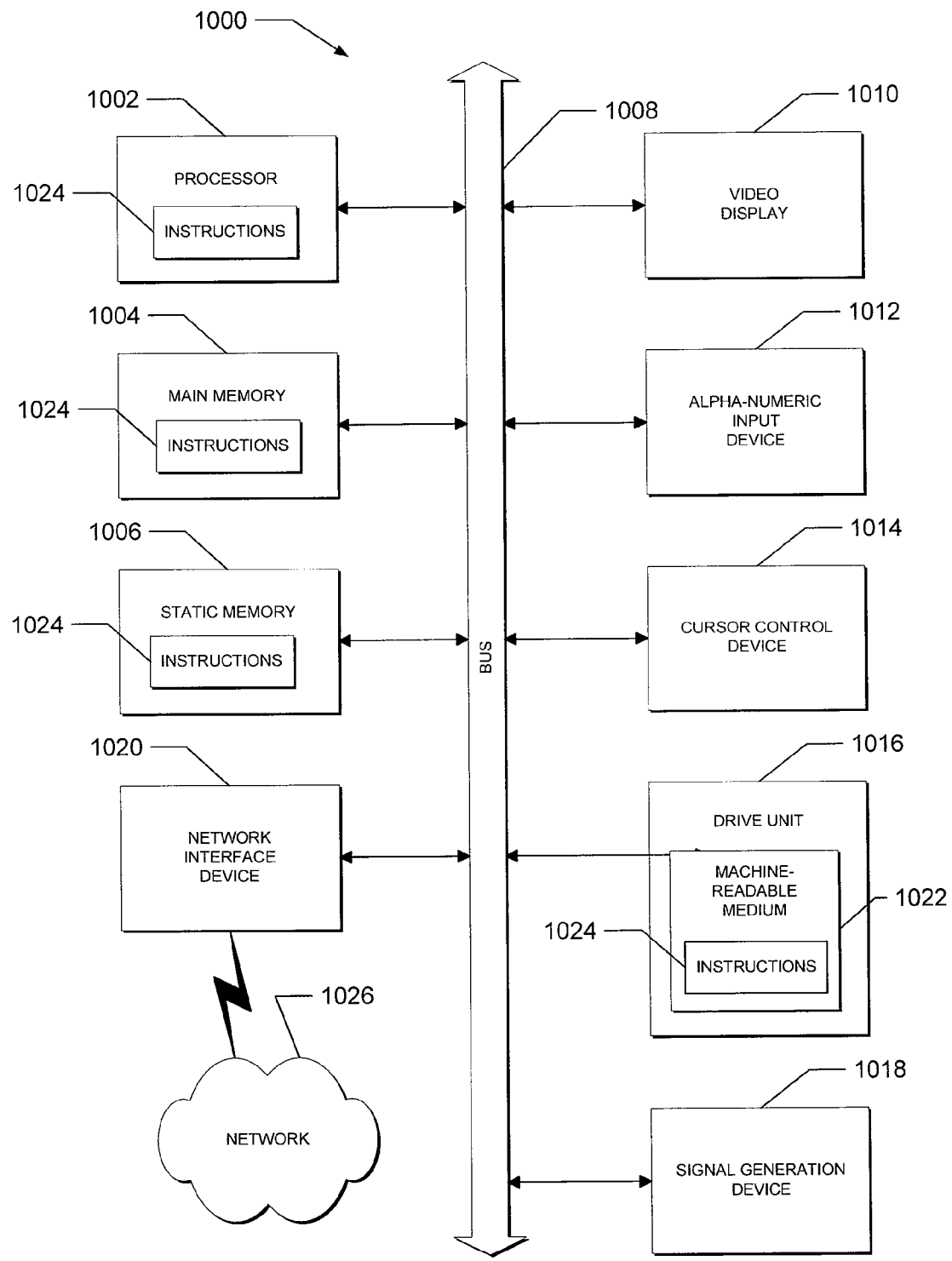
FIG. 5 is a block diagram of a machine in the example form of a computing system within which a set of instructions, for causing the machine to perform any one or more of the methodologies discussed herein, may be executed.

FIG. 5 is a block diagram of a machine in the example form of a computing system within which a set of instructions in the form of computer code, for causing the machine to perform any one or more of the methodologies discussed herein, may be executed. In alternative embodiments, the machine may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a Personal Digital Assistant (PDA), a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 1000 includes processor 1002 (e.g., a central processing unit (CPU), a graphics processing unit (GPU) or both), main memory 1004 and static memory 1006, which communicate with each other via bus 1008. Computing system 1000 may further include video display unit 1010 (e.g., a plasma display, a liquid crystal display (LCD) or a cathode ray tube (CRT)). Computing system 1000 also includes alphanumeric input device 1012 (e.g., a keyboard), user interface (UI) navigation device 1014 (e.g., a mouse), drive unit 1016 (which may be disk-based, or flash memory-based), signal generation device 1018 (e.g., a speaker) and network interface device 1020.

Drive unit 1016 includes machine-readable medium 1022 on which is stored one or more sets of instructions and data structures (e.g., software 1024 such as storage system analytics module 303 depicted in FIG. 3) embodying or utilized by any one or more of the methodologies or functions described herein. Software 1024 (e.g., computer code) may also reside, completely or at least partially, within main memory 1004 and/or within processor 1002 during execution thereof by computing system 1000, with main memory 1004 and processor 1002 also constituting machine-readable, tangible media. Software 1024 may further be transmitted or received over network 1026 via network interface device 1020 utilizing any one of a number of well-known transfer protocols (e.g., Hypertext Transfer Protocol (HTTP)).

While machine-readable medium 1022 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques modeling a storage environment at a specific time may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

The invention claimed is:

1. A computer-implemented method comprising:
receiving a request to mount, to a host system, a Logical Unit Number (LUN) of a snapshot on a network-based storage system;
determining that configuration information for mounting the LUN of the snapshot does not reside in a cache at the host system;
responsive to determining that configuration information for mounting the LUN of the snapshot does not reside in the cache at the host system, performing a discovery operation at the host system to i) identify configuration information for all host-based references of the host system that are mapped to LUNs of the network-based storage system, and ii) cache the configuration information identified during the discovery operation in the cache at the host system; and
mounting the LUN of the snapshot to the host system with configuration information identified during the discovery operation.

2. The computer-implemented method of claim 1, wherein the request specifies a drive letter, and mounting the LUN of the snapshot to the host system includes mapping the drive letter to a LUN path specified in the configuration information.

3. The computer-implemented method of claim 1, wherein the request specifies a volume mount point, and the LUN of the snapshot to the host system includes mapping the volume mount point to a LUN path specified in the configuration information.

4. The computer-implemented method of claim 1, wherein determining whether configuration information for mounting the LUN of the snapshot resides in the cache includes determining whether the configuration information has been residing in the cache for a duration of time that exceeds a predetermined duration of time specified in a command to populate the cache.

5. The computer-implemented method of claim 1, wherein the configuration information includes initiator information indicating a protocol supported by an initiator available to the host system for communicating with the network-based storage system.

6. The computer-implemented method of claim 1, further comprising:
prior to receiving the request to mount, to the host system, the LUN of the snapshot on the network-based storage system, receiving a request to populate the cache with configuration information for all host-based references of the host system that are mapped to LUNs of the network-based storage system;

performing a discovery operation at the host system to identify the configuration information for all host-based references of the host system that are mapped to LUNs of the network-based storage system; and caching the configuration information for all host-based references of the host system that are mapped to LUNs of the network-based storage system in the cache at the host system.

7. The computer-implemented method of claim 6, wherein the request to populate the cache specifies a time period during which the configuration information for all host-based references of the host system that are mapped to LUNs of the network-based storage system is considered valid, and after which the configuration information is considered stale.

8. The computer-implemented method of claim 6, further comprising:

subsequent to caching the configuration information for all host-based references of the host system that are mapped to LUNs of the network-based storage system in the cache, detecting an addition or deletion of a disk object at the host system; and responsive to detecting the addition or deletion of the disk object at the host system, performing a second discovery operation at the host system to update a cache entry with modified configuration information.

9. The computer-implemented method of claim 1, further comprising:

after mounting the LUN of the snapshot to the host system, performing a snapshot verification operation; and upon completion of the snapshot verification operation, unmounting the LUN of the snapshot.

10. A computer system comprising:

a processor for executing instructions in the form of computer code;

a memory device in communication with the processor, the memory device for storing instructions executable by the processor;

computer code to receive a request to mount, to the computer system, a Logical Unit Number (LUN) of a snapshot on a network-based storage system;

computer code to determine that configuration information for mounting the LUN of the snapshot does not reside in a cache at the computer system;

computer code to perform a discovery operation at the computer system responsive to the determination that configuration information for mounting the LUN of the snapshot does not reside in the cache at the computer system, the discovery operation to i) identify configuration information for all host-based references of the host system that are mapped to LUNs of the network-based storage system, and ii) cache the configuration information identified during the discovery operation in the cache; and computer code to mount the LUN of the snapshot to the host system with configuration information identified during the discovery operation.

11. The computer system of claim 10, wherein the request specifies a drive letter, the system further comprising:

computer code to map the drive letter to a LUN path specified in the configuration information identified during the discovery operation.

12. The computer system of claim 10, wherein the request specifies a volume mount point, the system further comprising:

computer code to map the volume mount point to a LUN path specified in the configuration information identified during the discovery operation.

13. The computer system of claim 10, further comprising:

computer code to determine whether the configuration information has been residing in the cache for a duration of time that exceeds a predetermined duration of time specified in a command to populate the cache.

14. The computer system of claim 10, wherein the configuration information includes initiator information indicating one or more protocols supported by an initiator available to the computer system for communicating with the network-based storage system.

15. The computer system of claim 10, further comprising:

computer code to receive a request to populate a cache with configuration information for all host-based references of the host system that are mapped to LUNs of the network-based storage system prior to receiving the request to mount, to the computer system, the LUN of the snapshot on the network-based storage system;

computer code to perform a discovery operation at the computer system to identify the configuration information for all host-based references of the host system that are mapped to LUNs of the network-based storage system; and computer code to cache the configuration information for all host-based references of the host system that are mapped to LUNs of the network-based storage system in the cache.

16. The computer system of claim 15, wherein the request to populate the cache specifies a time period during which the configuration information for all host-based references of the host system that are mapped to LUNs of the network-based storage system is considered valid, and after which the configuration information is considered stale.

17. The computer system of claim 15, further comprising:

computer code to detect an addition or deletion of a disk object at the computer system, subsequent to caching the configuration information for all host-based references of the host system that are mapped to LUNs of the network-based storage system in the cache; and computer code to perform a second discovery operation at the computer system to update one or more cache entries with modified configuration information in response to detecting the addition or deletion of the disk object at the computer system.

18. The computer system of claim 15, further comprising:

computer code to perform a snapshot verification operation after mounting the LUN of the snapshot to the host system and to unmount the LUN of the snapshot upon completion of the snapshot verification operation.

19. A computer-implemented method for verifying snapshots representing database backups residing at a network-based storage system, the method comprising:

receiving, at a storage management application executing at a host system, a request to populate a cache with configuration information for use in mounting LUNs of snapshots residing on the storage system to the host system, wherein the request i) is received from a server application executing at the host system, and ii) specifies a predetermined period of time during which configuration information written to the cache is to be considered valid;

responsive to receiving the request, performing a first discovery operation to populate the cache with the configuration information, wherein populating the cache includes writing cache entries to the cache, each cache entry specifying i) a host-based reference that maps to a LUN path of a LUN of the storage system, and ii) an initiator protocol for use by the host system in communicating with the storage system;

responsive to receiving a first request to mount a first LUN of a first snapshot, using configuration information in a first cache entry to mount to the host system the first LUN of the first snapshot representing a first database backup; and analyzing various data associated with the first snapshot to verify that a previously performed backup operation completed successfully and resulted in a viable database backup.

20. The computer-implemented method of claim 19, further comprising:

responsive to receiving a second request to mount to the host system a second LUN of a second snapshot representing a second database backup, determining whether a second cache entry was written to the cache within the predetermined period of time and is therefore valid; and if valid, using configuration information in the second cache entry to mount to the host system the second LUN of the second snapshot representing the second database backup; and analyzing various data associated with the second snapshot to verify that a previously performed backup operation completed successfully and resulted in a viable database backup.

21. The computer-implemented method of claim 19, responsive to receiving a second request to mount to the host system a second LUN of a second snapshot representing a second database backup, determining whether a second cache entry was written to the cache within the predetermined period of time and is therefore valid;

if not valid, performing a second discovery operation to update the configuration information residing in the cache;

using the updated configuration information to mount to the host system the second LUN of the second snapshot representing the second database backup; and analyzing various data associated with the second snapshot to verify that a previously performed backup operation completed successfully and resulted in a viable database backup.

22. The computer-implemented method of claim 19, further comprising:

after analyzing various data associated with the first snapshot to verify that a previously performed backup operation completed successfully and resulted in a viable database backup, unmounting the first LUN of the first snapshot.

23. The computer-implemented method of claim 1, wherein performing a discovery operation at the host system to identify configuration information for all host-based references of the host system that are mapped to LUNs of the network-based storage system comprises:

performing a volume object enumeration operation to identify disk objects that are associated with various volumes;

performing a disk object enumeration operation to identify disks that are mapped to various LUNs of the network-based storage system; and communicating a query to the network-based storage system for LUN path information used in mapping host-based disk objects to the LUNs of the network-based storage system.

24. The computer system of claim 10, further comprising computer code to i) perform a volume object enumeration operation to identify disk objects of the computer system that are associated with various volumes, ii) perform a disk object enumeration operation to identify disks that are mapped to various LUNs of the network-based storage system, and (iii) communicate a query to the network-based storage system for LUN path information used in mapping the disk objects of the computer system to the LUNs of the network-based storage system.

* * * * *